Oct. 30, 1934.  L. S. BURGETT  1,979,220
ARC WELDING APPARATUS
Original Filed April 27, 1929  5 Sheets-Sheet 1

INVENTOR
L. S. Burgett
BY
Arnold C. Rard
ATTORNEY

Oct. 30, 1934.	L. S. BURGETT	1,979,220
ARC WELDING APPARATUS
Original Filed April 27, 1929    5 Sheets-Sheet 2

INVENTOR
L. S. Burgett
BY
Arnold C. Rood
ATTORNEY

Oct. 30, 1934.    L. S. BURGETT    1,979,220
ARC WELDING APPARATUS
Original Filed April 27, 1929    5 Sheets-Sheet 3

INVENTOR
L. S. Burgett
BY
Arnold C. Rood
ATTORNEY

Oct. 30, 1934.  L. S. BURGETT  1,979,220
ARC WELDING APPARATUS
Original Filed April 27, 1929   5 Sheets-Sheet 5

INVENTOR
L. S. Burgett
BY
Arnold C. Rook
ATTORNEY

Patented Oct. 30, 1934

1,979,220

UNITED STATES PATENT OFFICE 1,979,220

ARC WELDING APPARATUS

Lynn S. Burgett, Euclid, Ohio

Application April 27, 1929, Serial No. 358,571
Renewed March 15, 1934

7 Claims. (Cl. 219—8)

This invention relates to welding apparatus and more particularly to improved arc welding apparatus arranged to provide welding current to one or to a plurality of welding operators.

The apparatus contemplated by this invention embodies features disclosed in my copending application for "Arc welding apparatus", Serial No. 300,408, filed August 18, 1928, together with certain other features and arrangements to produce advantageous results to be discussed hereinafter.

By the term "dynamotor" to be employed herein, I refer to the type of apparatus in which both motor and generator windings are disposed on a single armature core, thereby forming what may be termed a single-unit structure.

In many cases it is desirable that a welding machine be arranged to supply welding current simultaneously to two or more operators, such machines being termed herein "multi-operator" machines. So far as I am aware, in industrial work such multi-operator machines have ordinarily comprised motor generators, the motors of which have been actuated by either direct or alternating current and the generators delivering direct current for welding.

As pointed out in my said copending application Serial No. 300,408, dynamotors such as disclosed in said application actuated by alternating current and delivering direct current for welding, possess many advantages such as increased electrical and mechanical efficiency and ease of welding.

Objects of this invention are to provide arc welding apparatus of improved characteristics and high efficiency. Other objects are to provide arc welding apparatus of the dynamotor type actuated by alternating current and arranged to supply welding current to two or more welding operators.

Another object is to provide arc welding apparatus of the dynamotor type arranged to provide welding current at a constant potential to two or more welding operators simultaneously.

Another object is to provide arc welding apparatus of the dynamotor type which is convertible to provide welding current in most advantageous form to a plurality of operators working simultaneously or to a single operator.

A further object is to provide a dynamotor type of arc welding apparatus for multi-operator operation wherein each operator may draw the desired amount of welding current up to a given maximum without reference to the welding current being drawn by another operator or operators at the same time.

Other objects will be apparent to those skilled in the art from the disclosures herein made and the accompanying drawings, wherein Figure 1 is a perspective view showing a two operator welding apparatus.

Figure 1:
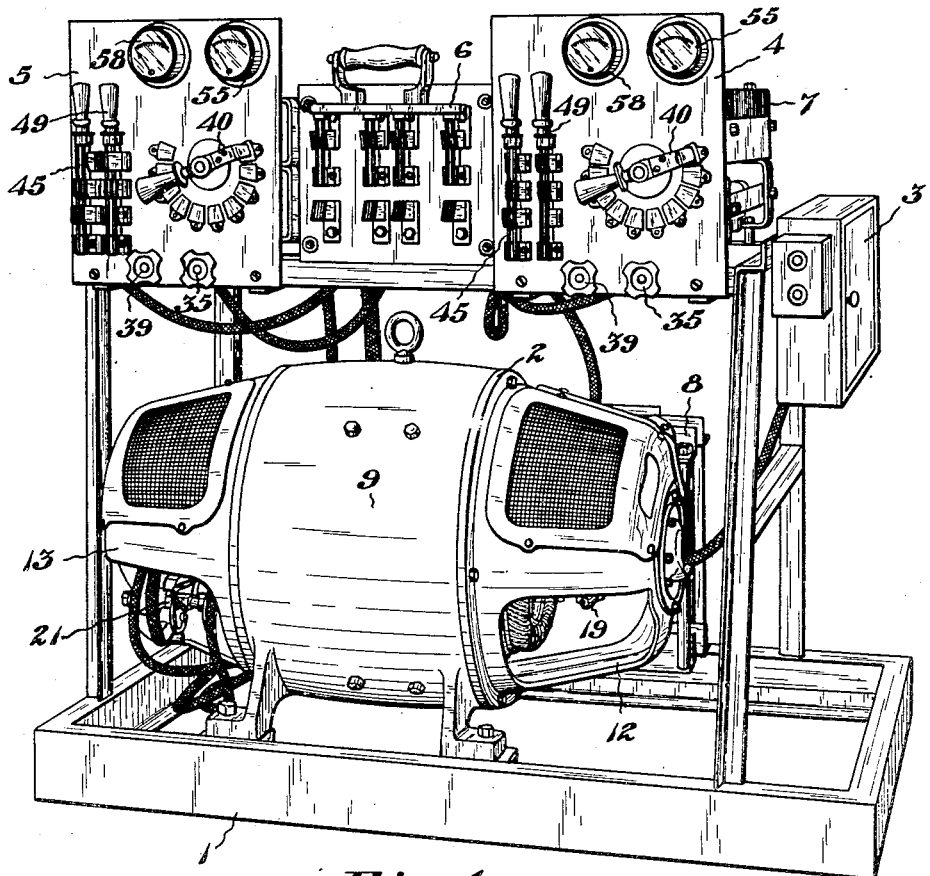

By my invention I have provided advantageous arc welding apparatus of the dynamotor type actuated by alternating current and generating direct current for welding. The apparatus is particularly arranged to supply welding current simultaneously to two or more operators. The apparatus may, of course, be employed to supply welding current to a single operator. Since the requirements for multi-operator operation and single-operator operation are somewhat different, one modification of my invention contemplates an apparatus arranged to operate at maximum efficiency for either type of operation.

The dynamotor apparatus of this invention involves advantageous features of operation and construction such as compactness, light weight, low mechanical losses, etc., discussed in my said copending application Serial No. 300,408, and reference may be had to said application.

For single operator operation apparatus having a drooping voltage characteristic has advantages including increased efficiency. In such apparatus, as disclosed in my copending application Serial No. 300,408, when the arc is drawn, the brush terminal voltage is considerably less than the open circuit voltage, and much less voltage is dissipated in resistance in reducing the same to the arc value than is the case where the voltage is reduced from open circuit value entirely by resistance. It will be understood that even when the apparatus has a drooping voltage characteristic it is desirable to dissipate some voltage in resistance for more stable operation of the apparatus. Such apparatus, while admirable for single operator welding, is not suitable for multi-operator welding. Thus, after one operator has commenced to weld, the brush terminal voltage drops considerably, and if a second operator desired to weld, he would have a considerably lower brush terminal voltage available, with the possible result that neither operator would be able to weld.

For multi-operator operation, however, the dynamotor should deliver welding current at constant potential at the brush terminals in order that a plurality of welders may weld without interfering with one another. In such construction the brush terminal voltage is always equal to the open circuit voltage, and when one operator commences to weld the voltage to his welding handle is reduced from the open circuit value to the welding value by dissipation in resistance, the operator obtaining the desired welding current by cutting in or out the requisite amount of resistance. If, now, a second operator desires to weld, he also has the open circuit voltage value to draw from and it is immaterial from the standpoint of the second operator whether or not the first operator is actually welding, and what welding current the first operator is employing.

My improved apparatus may be utilized for supplying welding current simultaneously to two or more welding operators as conditions may require. For this purpose I have provided the dynamotor with series fields whereby the welding current output on the dynamotor will be delivered at constant voltage. I have supplied variable resistances to reduce the voltage from the open circuit value to the welding value, so arranged that each operator may draw the desired current, without reference to the amount of welding current drawn simultaneously by another operator.

As explained above, the highest operating efficiency for single operator operation is obtained when the dynamotor has a drooping voltage characteristic, that is, where after commencement of the welding operation a portion of the voltage drop from open circuit value to welding value takes place within the machine itself. A modification of my invention involves therefore the convertibility of the dynamotor to the drooping voltage operation for use when only one operator is welding. This feature is particularly advantageous where the apparatus is utilized a considerable portion of the time for providing welding current to a single operator. By my invention, therefore, I provide an all-purpose machine giving maximum operating results and efficiency for any number of operators.

Figure 2:
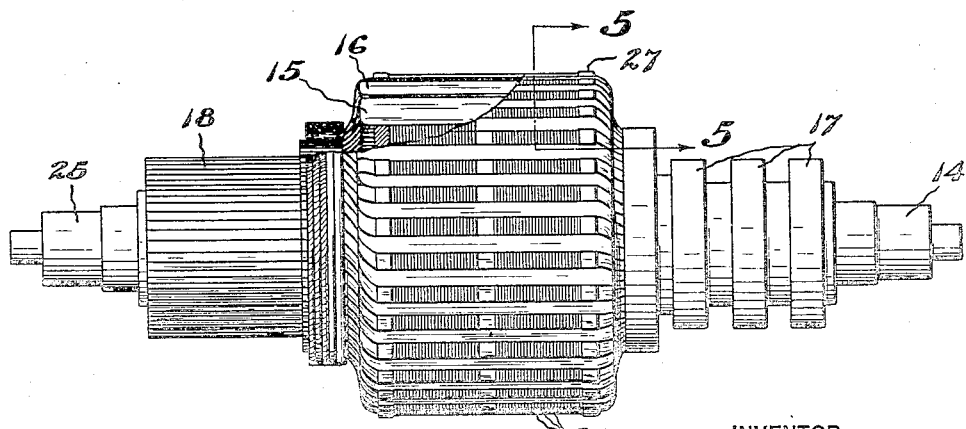
Fig. 2 is a front elevation partly in section of the armature of the dynamotor incorporated in the welding apparatus.
Figure 3:
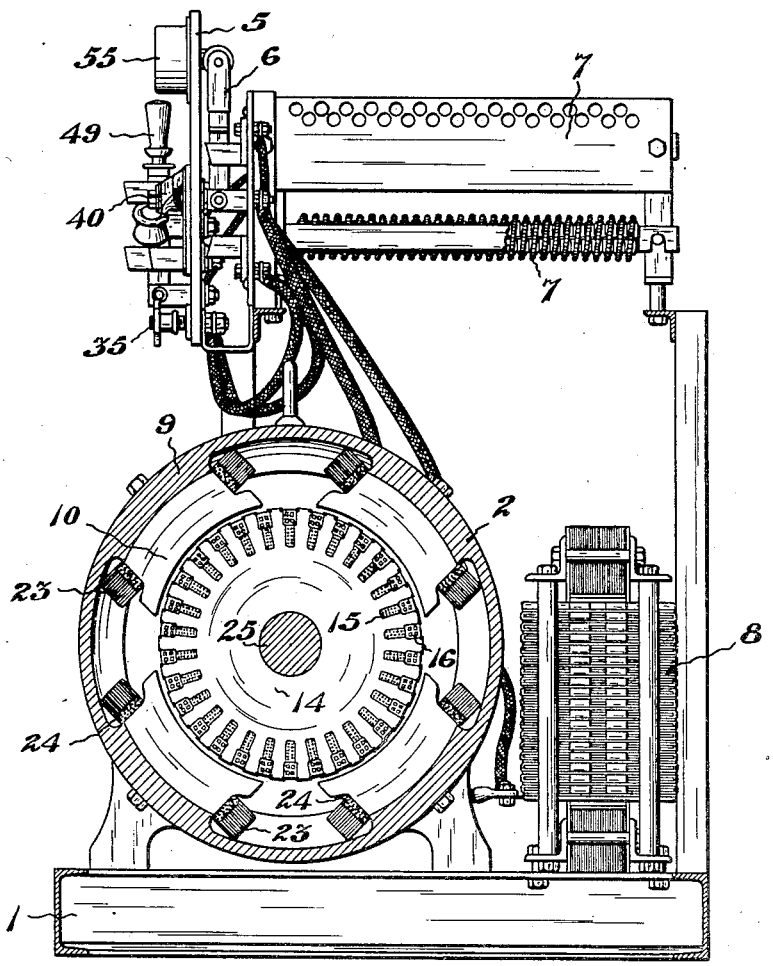
Fig. 3 is a vertical section through the welding apparatus showing the arrangement of dynamotor and control apparatus including resistors and inductances.
Figure 5:
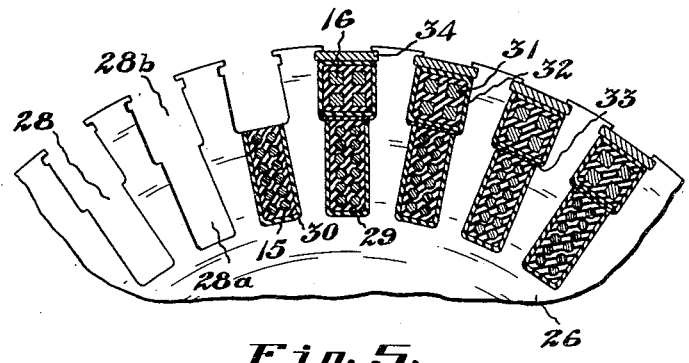
Fig. 5 is an enlarged sectional view taken on line 5—5 of Fig. 2 showing a portion of an armature lamination with coil windings disposed in certain of the armature slots.

Fig. 1 illustrates the form of apparatus arranged to deliver welding current at constant potential. With this machine, one operator may weld alone, or a plurality of welders may weld simultaneously without interfering one with another. A frame 1 serves as a support for a dynamotor 2, starter 3, control panels 4 and 5, a four pole double throw polarity reversing switch 6, resistors 7, and stabilizer inductances 8. The dynamotor 2 has an iron field frame 9, said frame having inwardly projecting field poles 10 as indicated in Fig. 3. The field frame 9 carries bearing brackets 12 and 13. An armature 14 as shown in Figs. 2 and 5 is journaled in bearing brackets 12 and 13 and carries two separate armature windings 15 and 16, the winding 15 leading to slip rings 17 and the winding 16 leading to commutator bars 18. Mounted on a suitable brush holder 19 carried by the bearing bracket 12 (Fig. 1) are brushes 20 which bear against the slip rings 17. The bearing bracket 13 carries another brush holder 21 on which are mounted brushes 22 which bear against the commutator bars 18. On the field poles 10 are series field windings 23 and shunt field windings 24 as shown in Figs. 3 and 7.

Referring to Figs. 2, 3, 5 and 6, the armature 14 has a central shaft 25. Secured to the shaft 25 are a number of thin circular iron plates or laminations 26. These are held together by end plates 27, also secured to the shaft 25. The laminations 26 and end plates 27 have a series of slots 28 cut in their peripheries, which slots are parallel to the axis of the shaft 25. The slots 28 as cut in any lamination may be of the shape shown in Fig. 5 having an inner rectangular portion 28a and an outer rectangular portion 28b.

Arranged in the slot portions 28a is the armature winding 15 which may be made up of a number of turns of circular wire 29 insulated from each other and connected electrically at suitable intervals to the slip rings 17. The winding 15 may also be insulated from the laminations 26 by an insulating liner 30 which together with the winding 15 completely fills the slot portion 28a. Arranged in the slot portions 28b is the armature winding 16 shown as made up of a number of turns of rectangular copper wire 31 of relatively large cross-sectional area, and insulated from each other. The turns of wire 31 are connected electrically at intervals to the commutator bars 18. The winding 16 is further insulated from the laminations 26 by an insulating liner 32. Between the liner 32 and the winding 15 is an insulating strip 33 extending laterally into the corners of the slot portion 28b. The insulating liner 32 when folded over the winding 16 completely fills the slot portion 28b. Both armature windings 15 and 16 are shown as securely held in the slots 28 by retainer wedge strips 34 driven in from the ends of the slots after the windings have been placed in position. It will be understood that the particular construction shown may be modified to suit a wide variety of conditions as regards speed and voltage.

Figure 6:
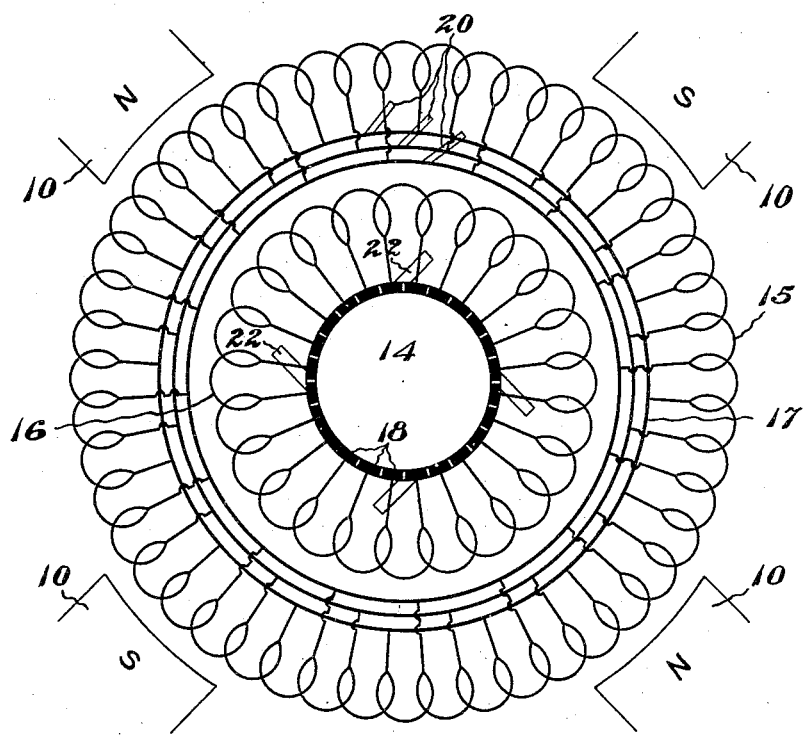
Fig. 6 is a schematic diagram illustrating the armature windings and magnetic field embodied in the dynamotor of the apparatus illustrated.
Figure 7:
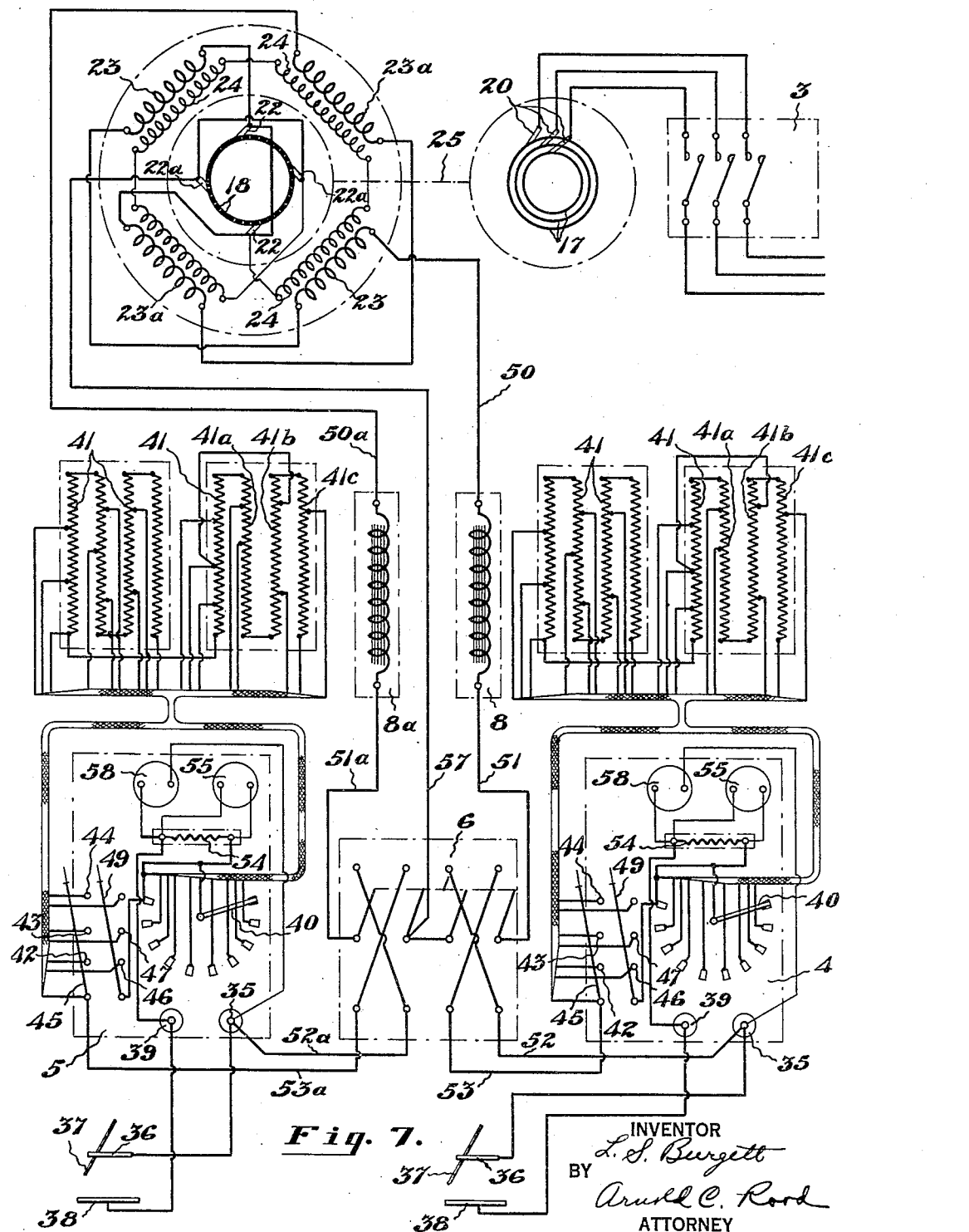
Fig. 7 is a detailed diagram illustrating the electrical connections of the apparatus illustrated in Fig. 1.

Referring to Figs. 6 and 7, polyphase alternating current at a suitable voltage is supplied through brushes 20 to slip rings 17, and is distributed to the windings 15. In starting the dynamotor the armature 14 is brought up to synchronous speed in the manner of an induction motor due to the reaction caused by eddy currents induced in the pole faces of the field poles 10. Pole face windings (not shown) may be used to make the dynamotor self-starting and to prevent hunting after the machine has reached synchronous speed. As the armature comes up to speed, a current is generated in the armature winding 16 by the reaction between the winding 16 and the field induced by the starting current flowing in the armature winding 15. The commutator bars 18 deliver this generated current to the brushes 22. The field windings 24 are so connected across the brushes 22 that they receive this current which rapidly builds up field magnetism between the field poles 10 until a state of equilibrium has been reached when the machine falls into step or synchronizes. The dynamotor then continues to operate at synchronous speed to generate direct current at a voltage dependent upon the supply voltage impressed on armature winding 15, the ratio of the number of turns in armature winding 15 to the number of turns in winding 16, and the field strength. The operation of the dynamotor is controlled from the starter 3 by means of a stop start push button station mounted thereon.

Figure 4:
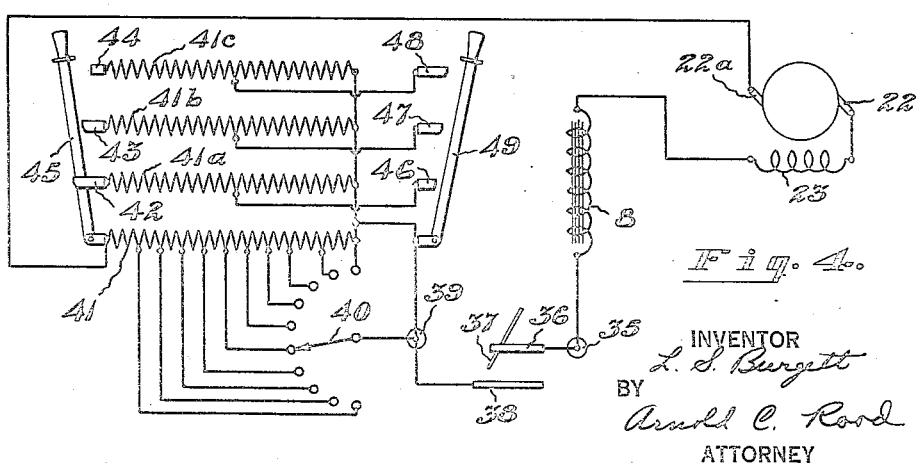
Fig. 4 is a schematic diagram of the electrical elements involved in each of the two sets of controls embodied in the welding apparatus shown in Fig. 1.

The diagram illustrated in Fig. 4 shows in simplified form the electrical circuit for one-half of a typical two-operator welding apparatus in accordance with my invention. One of the brushes 22 of the dynamotor 2 is connected electrically through the series field winding 23, stabilizer inductance 8 to a welding terminal 35. To the welding terminal 35 is connected an electrode holder 36, carrying a welding electrode 37. The work to be welded 38 is connected to welding terminal 39. Terminal 39 is connected through a dial switch 40 to a number of taps on a resistance winding 41. Arranged in parallel across resistance winding 41 are three additional resistance windings 41a, 41b and 41c. One end of each of the windings 41a, 41b and 41c is connected to switch terminal studs 42, 43 and 44, respectively, of the knife switch 45, the other end of each winding being connected in common to the terminal 39. Knife switch 45 is connected to resistance 41 and to brush 22a of dynamotor 2. Taps are taken off the resistance windings 41a, 41b and 41c and connected respectively to terminal studs 46, 47 and 48 of knife switch 49. Knife switch 49 is connected in common with the ends of windings 41a, 41b and 41c, to terminal 39. It will be observed that the terminal studs 42, 43 and 44 are of different lengths and so arranged that when the switch 45 is closed, contact is first made with terminal stud 42 only, then resistance winding 41a is connected in parallel with winding 41. By moving knife switch 45 into contact with terminal stud 43, both windings 41a and 41b become connected in parallel with winding 41. Contact with terminal stud 44 brings winding 41c into parallel with windings 41, 41a and 41b. The terminal studs 46, 47 and 48 of knife switch 49 are also of different lengths but arranged so that when the switch is closed a portion of each of the windings 41a, 41b and 41c is simultaneously short circuited. The amount of resistance in the various resistance windings is so disposed that by adjusting the dial switch 40 and the knife switches 45 and 49, any desired welding current may be obtained. Thus, to obtain a high welding current, dial switch 40 is adjusted to cut out practically all of the resistance in winding 41 and knife switches 45 and 49 are closed to parallel or short circuit resistance in windings 41a, 41b and 41c. To obtain a low welding current knife switch 45 is opened and dial switch 40 adjusted to cut in resistance of winding 41.

Fig. 7 shows a complete wiring diagram for a welding apparatus in which one dynamotor as described furnishes welding current for two or more separate welding circuits, such as shown in simplified form in Fig. 4. In Fig. 7 brushes 22 are connected together and assuming that they are positive, current collected by brushes 22 may flow into either or both welding circuits which circuits are in parallel. Current leaving brushes 22 may flow into series coils 23, through conductor 50 to stabilizer inductance 8, then through conductor 51 to the polarity reversing switch 6. Leaving reversing switch 6 current may flow through conductors 52 or 53, depending on switch position, to knife switch 45, or welding terminal 35 respectively, both being located on control panel 4. Assuming that welding terminal 35 is positive, current flows to electrode holder 36 through electrode 37, work 38 and back to welding terminal 39. Welding terminal 39 is connected to the ammeter shunt 54 across which is connected ammeter 55. Ammeter shunt 54 is connected to dial switch 40. The dial switch 40, together with the knife switches 45 and 49 and resistance windings 41, 41a, 41b and 41c constitute the control apparatus. Current flowing to the dial switch 40 passes through the resistance windings to knife switch 45 and thence back to the polarity reversing switch 6 through conductor 53. Passing through the switch the current flows through conductor 57 to brushes 22a of the dynamotor 2, completing the welding circuit. A voltmeter 58 connected between ammeter shunt 54 and welding terminal 35 indicates the voltage across the terminals 35 and 39 to which the welding leads are attached.

Instead of following the circuit as described above, the current may flow from brushes 22 into series coils 23a, through conductor 50a to stabilizer inductance 8a, and through conductor 51a to polarity reversing switch 6. Leaving switch 6, current may flow through either conductors 52a or 53a, depending on switch positions, to knife switch 45 or welding terminal 35 on control panel 5. The control apparatus on control panel 5 is identical with that on panel 4. Current leaving knife switch 45 passes through conductor 53a to reversing switch 6 and back through conductor 57 which is common to both circuits to brushes 22a of the dynamotor.

The shunt field winding 24 is connected across brushes 22 and 22a in parallel with both welding circuits. The purpose of the shunt field winding is to assist in synchronizing the dynamotor, after the machine has become synchronized with the line, and to a supply field in order to produce approximately unity power factor when operating under no load conditions.

Figure 8:
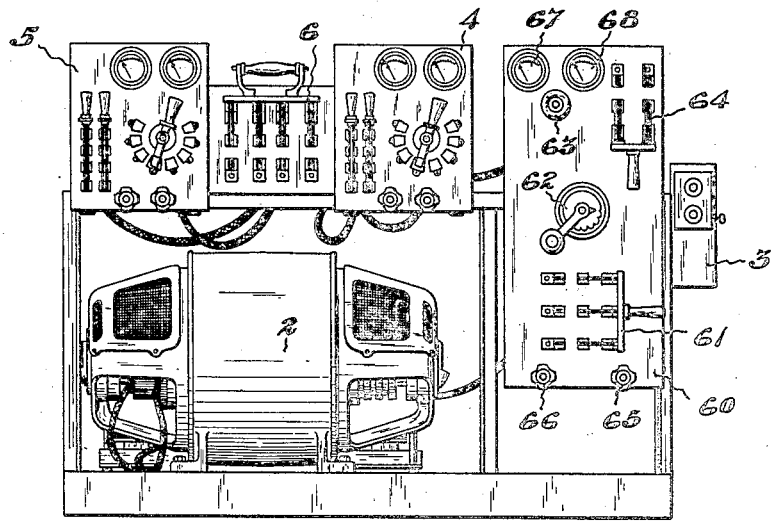
Fig. 8 is a front elevational view of welding apparatus arranged for constant potential multi-operator operation, and for drooping voltage characteristic single operator operation.
Figure 9:
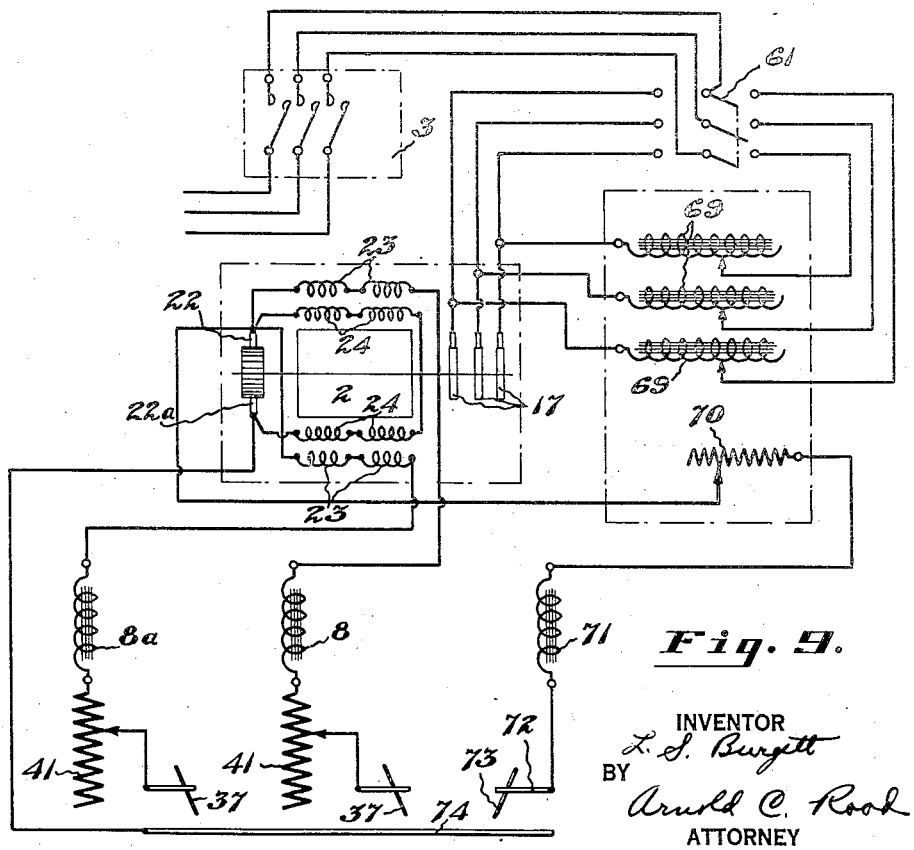
Fig. 9 is a schematic diagram showing electrical features of the apparatus illustrated in Fig. 8.

In Fig. 8 I have illustrated an embodiment of my invention wherein the apparatus operates at constant potential for multi-operator operation, and may be operated with a drooping voltage characteristic for single operator operation. The dynamotor 2, starter 3, with push button station, control panels 4 and 5, and reversing switch 6 are the same as shown in Fig. 1. Mounted beside the dynamotor 2 and on the frame 1 is a control panel 60 which carries a three pole double throw switch 61, a range switch 62, field rheostat 63, a two-pole double throw reversing switch 64, welding terminals 65 and 66, voltmeter 67 and ammeter 68. The schematic diagram illustrated by Fig. 9 shows in simplified form the electrical connection between the dynamotor 2 and the various pieces of control apparatus. The three pole double throw switch 61 is connected to the starter 3 and so arranged that polyphase alternating current from the starter may be switched directly to the slip rings 17 of the dynamotor 2 or through variable inductances 69 to the slip rings 17. The amount of inductance in each of the variable inductances 69 is regulated by the range switch 62.

The welding circuit for operation with a drooping voltage characteristic of the combination does not pass through any field coils but leads directly from the brushes 22 of the dynamotor through a very small variable resistance 70, and a stabilizer inductance 71 to the electrode holder 72 and electrode 73. From the work 74 the circuit returns to brush 22a of the dynamotor. The field rheostat 63 for the combination constant potential and drooping voltage welding apparatus is connected in the shunt field circuit and is used to vary the field strength when the machine is used as a single operator machine, with a drooping voltage characteristic.

Approximate adjustment of the welding current may be obtained over the range of capacity of the machine by means of the range switch 62. To obtain desired welding current values intermediate those obtainable by such range switch the field rheostat 63 may be adjusted to vary the strength of the field, which causes the motor windings to be under-excited or over-excited, resulting in a lagging or leading alternating current being drawn from the supply lines. The amount of lag or lead determines the terminal voltage and hence the welding current.

The control apparatus as mounted on panel 60 together with the variable inductances 69 and variable resistance 70 is fully explained and illustrated in my copending application Serial No. 300,408.

In operation, therefore, referring to Fig. 1, an operator may obtain the desired welding current by adjusting the dial switch 40 and knife switches 45 and 49 on either the panel 4 or 5. A second operator by adjusting the corresponding switches on the other panel may obtain whatever welding current value he desires independently of the current being drawn by the first operator and independently of whether the first operator is welding or not. The arrangement shown in Fig. 1, may, of course, be used for single operator operation and in such case many advantages incident to dynamotor operation may be obtained except that some efficiency is sacrificed by dissipating the voltage from open circuit to welding value by the resistances controlled by the switches 40, 45 and 49.

Thus, where a single operator is welding a considerable portion of the time, the construction shown in Fig. 8 is advantageous in that by making the required adjustments on panel 60 as previously described, the dynamotor may be caused to operate with drooping voltage characteristics and hence higher efficiency. Suitable switching means (not shown) may, of course, be provided so that more than one operator cannot draw welding current when the single operator mechanism controlled from panel 60 is in the circuit.

It will thus be seen that I have provided by my invention multi-arc welding apparatus having the higher operating and electrical efficiency of a dynamotor, and thus having a higher efficiency than possible with a motor generator type of welding apparatus.

It will further be noted that I have provided arc welding apparatus having the advantages of dynamotor construction and operation and arranged for efficient multi-operator operation with constant potential, and arranged also for drooping voltage operation when used by one operator only, whereby maximum efficiency may be obtained. The advantages of such construction, where the apparatus is used a considerable portion of the time by one operator only will be readily appreciated.

It will further be noted that I have provided an all-purpose welding machine, advantageous for use by one operator or simultaneously by more than one operator.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In arc welding apparatus, in combination, an armature, means for rotating said armature, generator windings on said armature, field windings connected in series with said armature windings to produce generated current of constant potential characteristics, a plurality of welding circuits arranged to take off direct current generated from said generator winding, means for imparting a drooping voltage characteristic within the generator to said generated current, and switch mechanism, whereby current at constant potential may be drawn from said armature for multi-operator welding and current having drooping voltage characteristics drawn for single operator welding.

2. In arc welding apparatus of the dynamotor type arranged to provide welding current of constant voltage characteristics simultaneously to a plurality of welding operators or to provide welding current of drooping voltage characteristics to one welding operator, in combination, an armature, motor and generator windings on said armature, means for supplying polyphase alternating current to said said motor windings, means for supplying welding current at constant potential to a plurality of operators comprising field windings connected in series with the generator winding to over-excite the same in proportion to the welding current drawn and a plurality of welding circuits arranged to take off said direct current at constant potential, means for supplying welding current of drooping voltage characteristics to a single operator comprising adjustable inductances in the motor circuit, a field winding excited by direct current, means for adjustably exciting the field from the generator circuit and an adjustable resistance connected in series with said welding circuit, and means for selectively utilizing the means for multi-operator operation or single operator operation.

3. In arc welding apparatus, in combination, an armature, generator windings on said armature, field windings connected in series with said armature windings to produce generated current of constant potential characteristics, a plurality of welding circuits arranged to take off direct current generated from said generator winding, means comprising an adjustable shunt field for imparting a drooping voltage characteristic within the generator, and adjustable means whereby current at constant potential may be drawn from said armature for multi-operator welding and current having drooping voltage characteristics drawn for a single operator welding.

4. In an arc welding apparatus of the dynamotor type, in combination, an armature, motor and generator windings on said armature, conductors for transmitting alternating current to the motor windings, field windings connected in series with said generator windings, means for imparting a drooping voltage characteristic within the generator for single welding operations, and adjustable means whereby current at a constant potential may be drawn from said armature for multi-operator welding and current having drooping voltage characteristics drawn for single operation.

5. In arc welding apparatus of the dynamotor type, in combination, an armature, motor and generator windings on said armature, conductors for transmitting alternating current to the motor windings, field windings connected in series with said generator windings, variable inductances associated with each phase of the alternating current for providing drooping voltage characteristics for single welding operation, and switching means for eliminating said inductances to provide constant potential at the generator terminal for multiple welding operations.

6. In arc welding apparatus of the dynamotor type, in combination, an armature, motor and generator windings on said armature, conductors for transmitting polyphase alternating current to the motor windings, shunt field windings excited by direct current, field windings connected in series with said generator windings for maintaining a constant potential for multiple operation, and means for adjusting the shunt field windings to provide drooping voltage characteristics for single operation.

7. In a welding apparatus of the dynamotor type, in combination, an armature, motor and generator windings on said armature, conductors for transmitting alternating current to the windings, a shunt field winding connected to said generator windings, a variable inductance associated with each phase of alternating current, field windings connected in series with said generator windings, an inductance for each phase of the alternating current, and a variable resistor in the shunt field for producing drooping voltage for single operation, and means for eliminating said inductance when the apparatus is utilized for multi-operations.

LYNN S. BURGETT.